M. HAWKINS.
COLT WEANER.
APPLICATION FILED MAY 25, 1916.
1,251,886.
Patented Jan. 1, 1918.
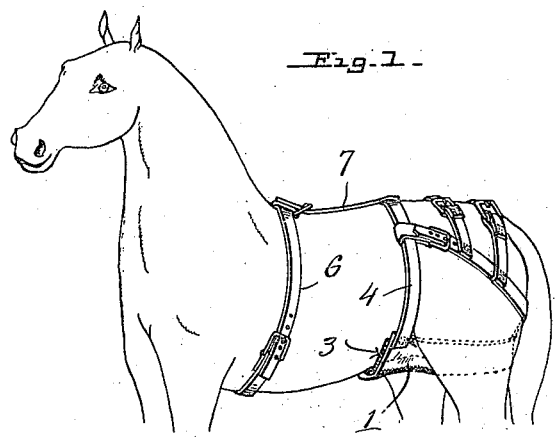
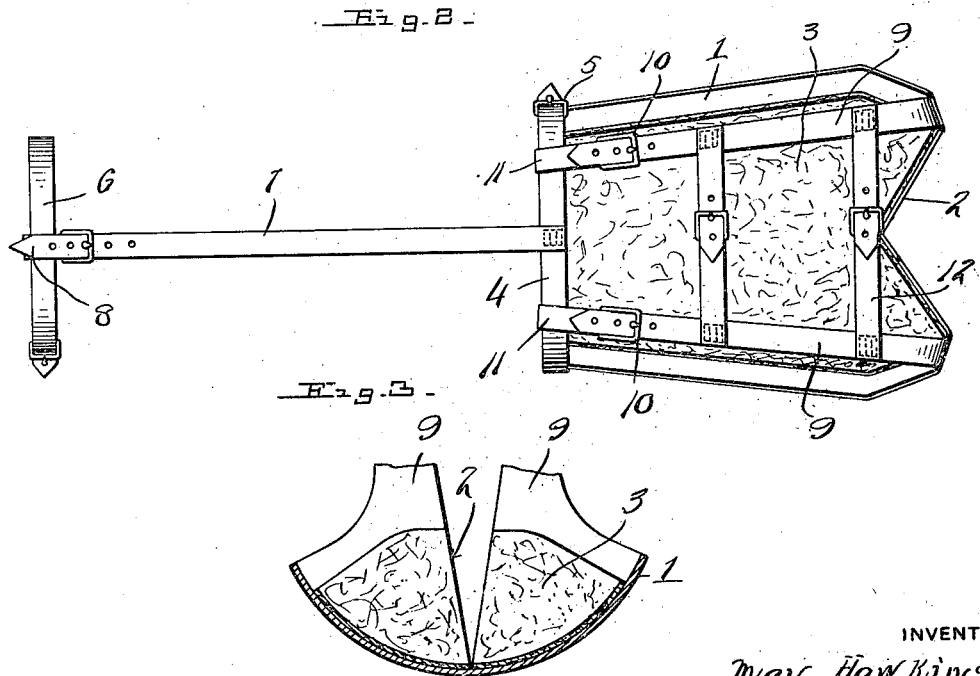
INVENTOR
May Hawkins.
WITNESSES

UNITED STATES PATENT OFFICE.

MAY HAWKINS, OF TAR KILN, ARKANSAS.

COLT-WEANER.

1,251,886.  Specification of Letters Patent.  Patented Jan. 1, 1918.

Application filed May 25, 1916. Serial No. 99,861.

*To all whom it may concern:*

Be it known that I, MAY HAWKINS, a citizens of the United States, residing at Tar Kiln, in the county of Carroll and State of Arkansas, have invented certain new and useful Improvements in Colt-Weaners, of which the following is a specification.

This invention relates to colt weaners, and the nature and objects thereof will be readily apparent to those skilled in the art to which it appertains in the light of the following explanation of the accompanying drawings, illustrating what I now believe to be the preferred embodiment of my invention, from among other forms and arrangements within the spirit thereof, and the scope of the appended claim.

However, an object of the invention is to provide a colt weaner in the form of a protective pad adapted to be secured in place beneath the mammary glands of a mare, to prevent its colt from obtaining access thereto, and continued association of the colt with its parent permitted.

In addition to the foregoing my invention comprehends improvements in the details of construction and arrangement of parts, to be hereinafter described and particularly pointed out in the appended claim.

In the accompanying drawings in which similar and corresponding parts are designated by the same characters of reference throughout the several views, in which they appear;

Figure 1 is a view in perspective, illustrating the application of my invention to an animal.

Fig. 2 is a view in plan of my device, and,

Fig. 3 is a detail transverse section therethrough.

With reference to the drawings, 1 indicates a pad, which may be made of fabric or other flexible material, is substantially rectangular in conformation with its longitudinal edges however slightly converging. The pad is curved transversely and provided at its larger end with a substantially V-shaped cut-away portion, as indicated at 2. The pad is disposed beneath the abdomen of the mare, in close contact with the body of the animal and entirely covering its mammary glands, a soft lining 3 being provided to prevent chafing.

The forward end of the pad is supported by a band 4 which is extended transversely around the back of the animal, and is provided with a buckle 5 whereby its length may be varied. An adjustable belly band 6 is provided for encircling the body of the animal near its fore legs, and a back strap 7 is sewed or otherwise secured to the upper portion of the supporting band 4, at one end of said back strap, while the other end thereof is formed with a looped portion 8 engaging around the upper portion of the belly band 6. The back strap 7 is thus disposed longitudinally upon the back of the animal, and its length may be varied to apply the device to animals of various sizes.

The pad 1 is formed at its rear end and at each side of the V-shaped cut-away portion, with integrally formed hip straps 9, which are extended across the hips of the animal and connected to buckles 10 secured to loops 11 encircling the supporting bands 4 at each side of the point of connection thereto of the back strap. The hip straps 9 are connected together at suitable intervals by means of adjustable connecting straps 12, which retain the hip straps in proper position and extends transversely across the back of the animal.

Owing to the arrangement of supporting straps which I have provided, the pad is retained securely in place, and cannot be displaced by either the mare, or the colt.

While I have illustrated and described my invention with some degree of particularity, I realize that in practice various alterations therein may be made and I therefore reserve the right and privilege of changing the form of the details, or otherwise altering the arrangement of the correlated elements, without departing from the spirit of the invention or the scope of the appended claim.

Having thus described my invention, what I claim as new and desire to secure by Letters Patent is:

A colt weaner, comprising a substantially rectangular flat strip of flexible material having one end formed with a V-shaped cut away portion, straps integrally formed on the terminals of the cut away portion, a band connected to the opposite end of the strip, the straps being connected to said band, a second band, and a strap connecting the second band with the first, whereby the strip may be tightly bound on the body of the animal and secured thereto against movement.

In testimony whereof I affix my signature in presence of two witnesses.

MAY HAWKINS.

Witnesses:
CHAS. F. WILLIAMS,
AMOS M. TAYLOR.